H. STRIPE.
CULTIVATOR.
APPLICATION FILED AUG. 4, 1908.
937,268.
Patented Oct. 19, 1909.
3 SHEETS—SHEET 2.
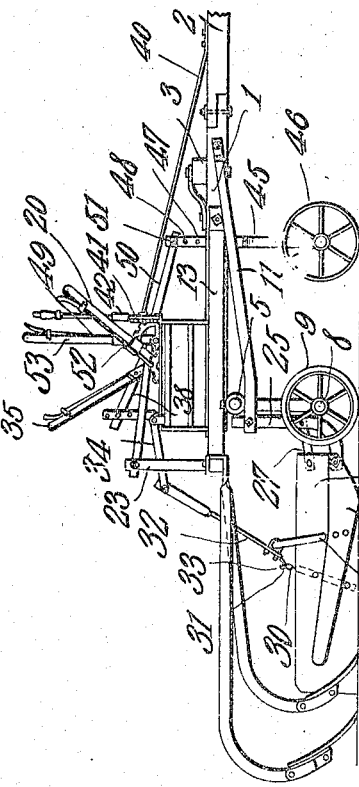
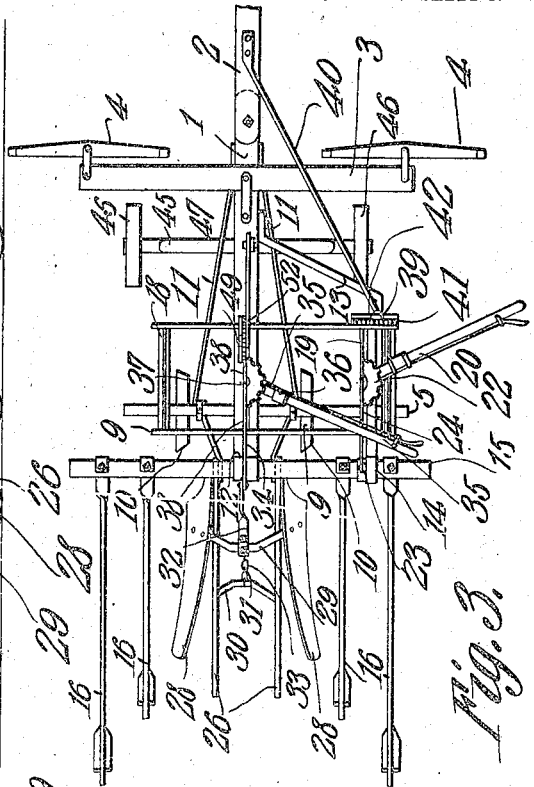
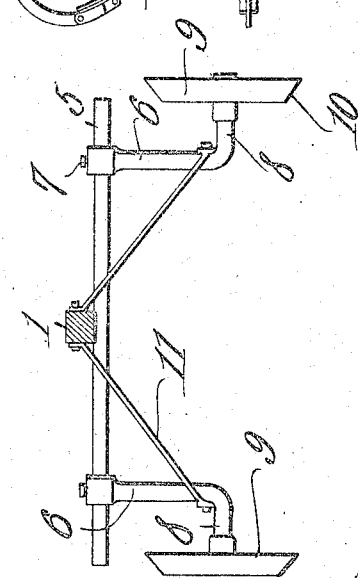
Witnesses
Inventor
Henry Stripe.
By
Attorneys

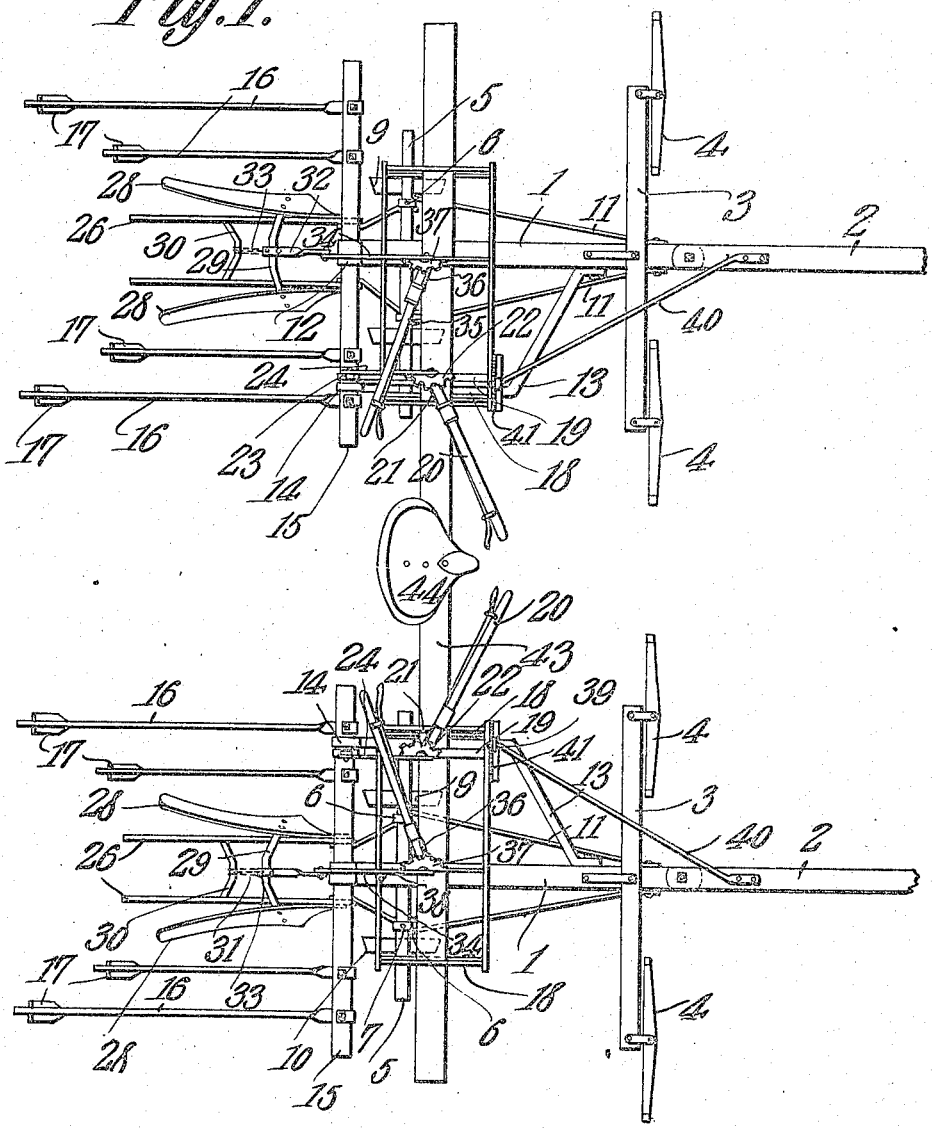

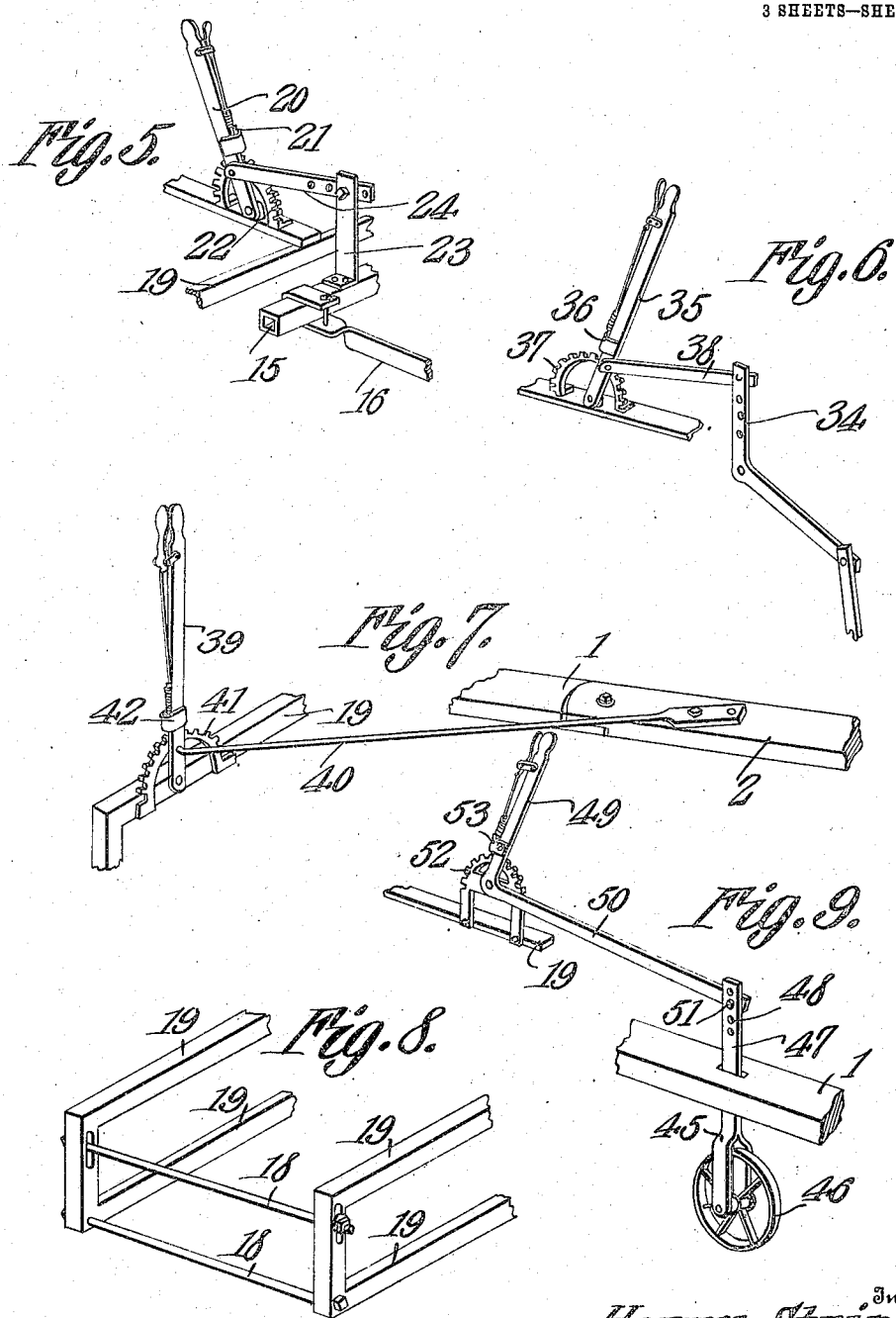

UNITED STATES PATENT OFFICE.

HENRY STRIPE, OF MILAN, KANSAS.

CULTIVATOR.

937,268.   Specification of Letters Patent.   Patented Oct. 19, 1909.

Application filed August 4, 1908. Serial No. 446,920.

*To all whom it may concern:*

Be it known that I, HENRY STRIPE, a citizen of the United States, residing at Milan, in the county of Sumner and State of Kansas, have invented a new and useful Cultivator, of which the following is a specification.

This invention has relation to cultivators and it consists in the novel construction and arrangement of its parts, as hereinafter shown and described.

The object of the invention is to provide a cultivator that can be effectually used for cultivating a single row of plants, or two rows thereof. This is to say the said cultivator may be used singly, or two cultivators may be connected up with each other, whereby they may be used in conjunction with each other.

In the accompanying drawings:—Figure 1 is a top plan view of two cultivators operatively connected together. Fig. 2 is a side elevation of the cultivator. Fig. 3 is a top plan view of the same, and Fig. 4 is a transverse sectional view of a portion of the cultivator. Fig. 5 is a detail perspective view of a lever mechanism used upon the cultivator to swing cultivator beams vertically. Fig. 6 is a detail perspective view of a lever mechanism used upon the cultivator to raise or lower fenders. Fig. 7 is a detail perspective view of a lever mechanism used upon the cultivator to swing a tongue laterally. Fig. 8 is a detail perspective view of a portion of a frame used upon the cultivator. Fig. 9 is a detail perspective view of a lever mechanism used upon the cultivator to swing the frame vertically.

The cultivator consists of the stub tongue 1, to the forward end of which is pivotally attached the tongue proper. The said tongue 2, is arranged to swing in a horizontal plane. The double-tree 3, is pivotally mounted upon the stub tongue 1, and the swingle-trees 4, are connected with the ends of the double-tree 3, in the usual manner. The cross-bar 5, is attached to the rear end portion of the stub tongue 1, and the depending brackets 6, are slidably mounted upon the said bar 5, and are adapted to be secured in adjusted positions thereon by means of the set screws 7, which pass transversely through the upper portions of the said brackets and are adapted to impinge at their inner ends the surface of the said bar 5. The lower portions of the said brackets 6 merge into the outwardly disposed spindles 8, upon which are journaled the ground wheels 9. The said wheels 9 are provided with beveled peripheries 10, and the periphery 10, of one wheel lies parallel with the periphery 10, of the other wheel attached to the same cultivator; therefore as the said wheels pass along the furrow the said beveled surfaces 10, will have a tendency to coerce the wheels 9 to travel in the bottom of the furrow. The braces 11 are attached at their upper forward ends to the stub tongue 7, and at their lower portions are adjustably connected with the lower end portions of the said brackets 6. Thus it will be seen that means is provided for spreading the said wheels 9 apart or for bringing the same together, as occasion or fancy may indicate or require. The rear end of the stub tongue 1 is provided with a bearing 12. The forward end of the bracket 13, is attached to the side of the stub tongue 1, and the said bracket 13, is fixed in its relation with the said tongue 1. The rear end of the said bracket 13 is provided with a bearing 14, which is in alinement transversely of the cultivator with the bearing 12, mounted upon the stub tongue 1. The shaft 15, is journaled in the bearings 12 and 14, and the forward ends of the plow standards 16, are fixed to the said shaft 15. The plow points 17, are carried by the rear end to the said standards 16.

A frame is mounted upon the upper portion of the stub tongue 1, and upon the brackets 13. Said frame includes in part the parallel rods 18, and the cross-bar 19. The lever 20 is fulcrumed upon the cross-bar 19, and is provided with a pawl mechanism 21, which is adapted to engage a gear segment 22, also mounted upon the said cross-bar 19. The arm 23, is mounted upon the shaft 15, and the link 24, is pivotally connected at one end with the said arm 23, and at its opposite end with the lever 20. Thus it will be seen that by swinging the said lever 20, that the shaft 15 may be partially rotated and that the plow standard 16 may be raised or lowered as desired.

The arm 25, depends from the rear ends of the braces 11, and the forward end portions of the fenders 26 are pivotally connected with the said arm 25; or with the strips 27, which extend rearwardly from the said arm 25. The forward ends of the mold boards 28, are pivotally connected with the lower end of the said arm 25. The said boards are connected together by the arched yoke 29, which straddles the upper edges of the fenders 26. The bars 30, are attached to the inner sides of the blades 26, and the chain 31 connects the bars 30 of the two fenders 26 together. The link 32 is clamped at its lower portion to the yoke 29, and is provided at its lower extremity with a hook 33, which engages one of the links of the chain 31. The upper end of the link 32, is pivotally connected with the rocker 34, which is fulcrumed upon the frame mounted upon the rear end portion of the tongue 1. The lever 35 is fulcrumed upon the said frame and is provided with a pawl mechanism 36, which is adapted to engage the gear segment 37, also mounted upon the said frame. The forward end of the link 38, is pivotally connected with the said lever 35, and the rear end of the said link is pivotally connected with the upper end portion of the rocker 34. By swinging the lever 35 it is obvious that the rocker 34 will be moved upon its pivot and that the fenders 26, and the mold boards 28 may be raised or lowered as desired.

The lever 39 is pivoted upon one end portion of the frame, which is mounted upon the stub tongue 1, and the rear end of the bar 40 is pivotally connected with the said lever 39, while the forward end of the said bar is connected with the tongue proper 2. The gear segment 41 is mounted upon the said frame and is adapted to be engaged by a pawl mechanism 42, which is carried by the lever 39. Thus it is obvious that by swinging the lever 39, that the tongue 2 may be swung laterally. This means of adjustment of the tongue 2 is provided in order that the said tongue may be kept vertically over a row of plants, irrespective of irregular movement on the part of the draft animal, or should the said plants happen not to stand in strict alinement.

The parts above described are all that is necessary to be used when the implement is operated upon a single row of plants. When, however, it is intended to use two or more of the said cultivators and operate the same in conjunction one with the other, the end portions of a sill 43, are placed between the rods 18, of the frame which is mounted upon the stub tongues 1 of two of the said implements. The said rods 18 are then clamped together whereby the end portions of the sill 43 are firmly held, and the operator's seat 44, is mounted upon the intermediate portion of the said sill 43. Thus it will be seen that means is provided for connecting two or more of the said cultivators together, and that they may travel abreast of one another. The sill 43, is of sufficient length to permit the two cultivators which are joined together thereby to operate upon two rows of plants with a row between the said two rows which are being operated upon, thereby sufficient space is provided for four horses to travel abreast, without trampling upon the plants in any of the said rows.

The object in providing the adjustable brackets upon the cross-bar 5, is that the said brackets may be brought together or spread apart, so that the wheels 9, may travel in the bottom of the furrow, whether the said furrows be close together or far apart relatively; and when the furrows are close together, a supplemental truck is applied to the stub tongue 1, for the purpose of preventing the said implement from tilting, or tipping over laterally. The said truck consists of the yoke 45, to the lower end portions of which is journaled the ground wheels 46. The said wheels 46 are spaced apart relatively, that is to say, they are farther apart than the wheels 9. The standard 47, is erected upon the intermediate portion of the yoke 45, and is adapted to pass through an opening in the stub tongue 1, and is provided at its upper portion with a series of perforations 48. The lever 49, is fulcrumed upon the frame which is mounted upon the stub tongue 1, and is provided with a working end 50, which may be adjustably connected with the said standard 47, by a transverse bolt 51, which passes transversely through the said working end 50, of the said lever, and any one of the perforations of the series 48, provided in the said standard 47. The gear segment 52, is mounted upon the frame which is located upon the stub tongue 1, and the pawl mechanism 53, is carried by the lever 49, and is adapted to engage the gear teeth of the said segment 52. By this arrangement, it is obvious that by swinging the lever 49, that the standard 47 and the yoke 45 may be raised or lowered, whereby the forward end portion of the stub tongue 1, will be shifted vertically with relation to the said standard 47, and at the same time that by reason of the fact that the ground wheels 46 are located upon the ground in lines beyond those upon which the ground wheels 9, travel, the said ground wheels 46 will brace the implement and prevent any tendency on the part of the same to lateral tilt or swing. By this arrangement of parts it is apparent that an implement is provided which may be economically and effectually used for cultivating a single row of plants at a time, or that by rigging the implements together in pairs, as described, two rows of plants may be operated upon at the same time. The plants that are operated upon pass between the fenders 26 and the mold boards 28 cut under the earth which then falls back while the fenders 26 prevent the returning soil from covering the standing plants. After the soil has thus been worked until the furrows between the rows of plants are filled, the mold boards and fenders are raised and the standards 16 are lowered and the crop may be cultivated in the usual manner until made.

Having described my invention, what I claim as new, and desire to secure by Letters Patent is:—

1. A cultivator comprising a plurality of stub tongues, a tongue pivotally connected with each stub tongue, a frame lying transversely across said stub tongues, a lever mechanism mounted upon each frame, means connecting each lever mechanism with each tongue for swinging the same with relation to the stub tongues, and a sill lying at its end portions transversely across the stub tongues and being secured in the said frames.

2. A cultivator comprising a plurality of stub tongues, tongues pivotally connected with the said stub tongues, frames lying transversely across the stub tongues, lever mechanisms mounted upon the frames, means operatively connecting the said lever mechanism with the tongues to swing the same laterally with relation to the stub tongues, means for raising and lowering the stub tongues, a sill lying transversely across the stub tongues, and means carried by the said frames for securing the end portions of the said sill.

In testimony that I claim the foregoing as my own, I have hereto affixed my signature in the presence of two witnesses.

HENRY STRIPE.

Witnesses:
JOHN PHILLIPPI,
J. T. SAPPENFIELD.